Figure 9:
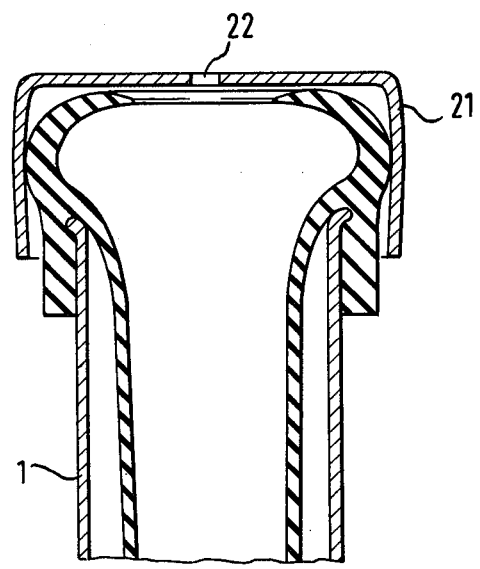

United States Patent [19]

Happel et al.

[11] 4,441,454
[45] Apr. 10, 1984

[54] MILKING APPARATUS

[75] Inventors: Fritz Happel, 8951 Baisweil 24; Werner Happel, both of Baisweil, Fed. Rep. of Germany

[73] Assignee: Fritz Happel, Baisweil, Fed. Rep. of Germany

[21] Appl. No.: 346,033

[22] PCT Filed: May 27, 1981

[86] PCT No.: PCT/EP81/00058
§ 371 Date: Jan. 27, 1982
§ 102(e) Date: Jan. 27, 1982

[87] PCT Pub. No.: WO81/03412
PCT Pub. Date: Dec. 10, 1981

[30] Foreign Application Priority Data

May 28, 1980 [DE] Fed. Rep. of Germany ....... 3020294
Jun. 16, 1980 [DE] Fed. Rep. of Germany ....... 3022555

[51] Int. Cl.³ ............................ A01J 5/04; A01J 5/08
[52] U.S. Cl. ............................. 119/14.36; 119/14.38; 119/14.52; 119/14.55
[58] Field of Search ............... 119/14.31, 14.36, 14.38, 119/14.55, 14.52, 14.18

[56] References Cited

U.S. PATENT DOCUMENTS

| 807,372 | 12/1905 | Gillies | 119/14.52 |
| 2,702,526 | 2/1955 | Torgerson | 119/14.55 |
| 3,149,609 | 9/1964 | Noorlander | 119/14.18 |
| 3,255,732 | 6/1966 | Raht | 119/14.31 |
| 3,611,993 | 10/1971 | Norton | 119/14.36 |
| 4,263,875 | 4/1981 | Maier et al. | 119/14.36 |

Primary Examiner—Hugh R. Chamblee

[57] ABSTRACT

A milking apparatus is described in which air is periodically introduced into the milking cups for the purpose of teat care and improved milk removal and in which a mutual separation of the udder quarters is effected in the collection chamber via a non-return valve arrangement to avoid back spray and reverse flow.

14 Claims, 17 Drawing Figures

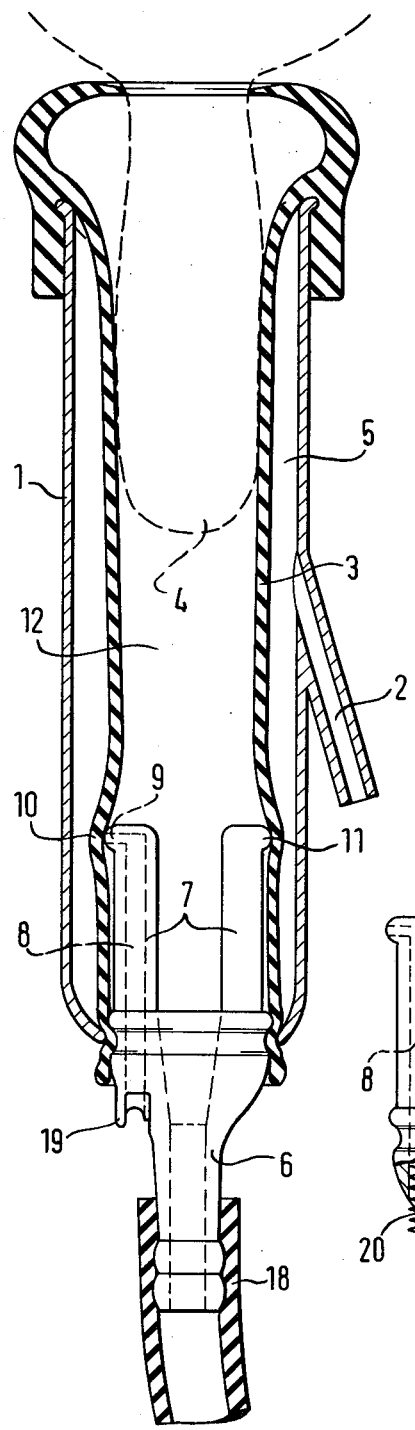
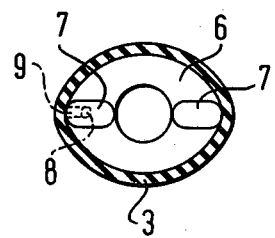
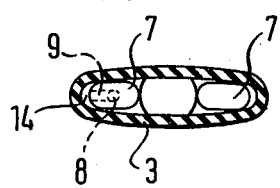
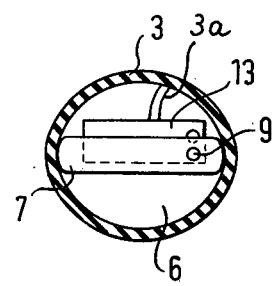
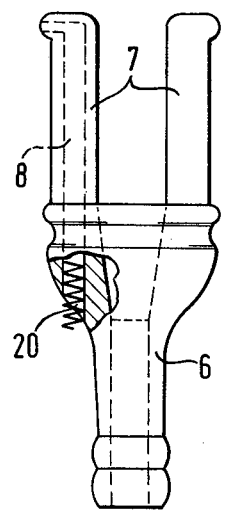
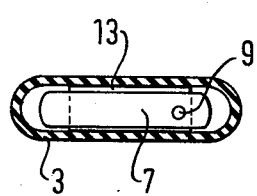

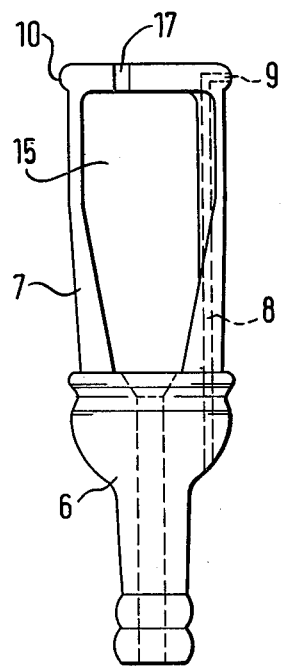
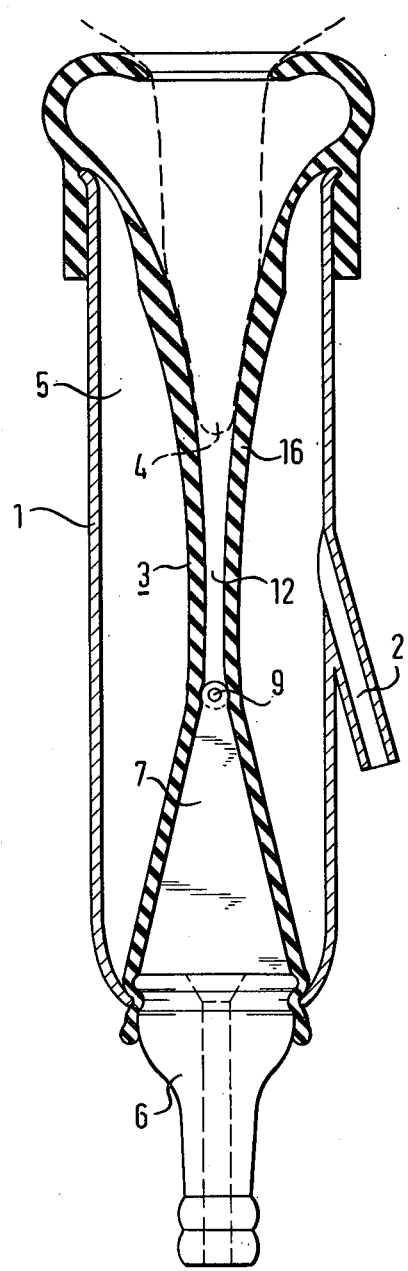
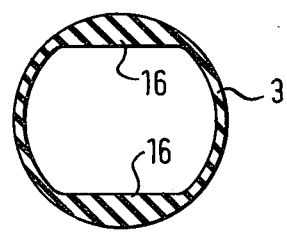

MILKING APPARATUS

The invention relates to a milking apparatus with a collection chamber having a connection for a vacuum source and four two-chamber milking cups which are connectable via short milk lines to mutually displaced collection chamber connections, with each milking cup having a valve unit actuated in dependence on the pressure differences which occur in the suction and massage pulses to connect the inner chamber of the milking cup to atmosphere.

Known milking apparatus of this kind, in which attempts are made, on the one hand, to connect the teat rubber inner space to atmosphere during the massage pulse in order to improve the discharge of milk and to care for the teats and, on the other hand, to prevent the consequences of the dangerous back spray effect, are of very complicated construction, difficult to clean and still do not function in an entirely satisfactory manner.

An apparatus which allows air to be introduced from the atmosphere into the teat rubber inner space during the massage pulse is known from DE-PS 1 299 165. The special valve arrangement that is used in this apparatus requires special milking cups, makes the cleaning of the milking cups difficult and also makes it necessary to exchange the valve units at regular intervals in order to ensure the functioning of the milking cup.

The reverse spray effects which lead to udder diseases are described in the journal "Top Agrar Extra, Milk Technique 1979" in particular at pages 36 to 39. It is explained in detail in this article that the decisive mechanism for the transfer and penetration of bacteria is to be seen in the reverse flow or back spray, which occurs in the milking equipment, through which milk is transferred from diseased quarters to healthy quarters of the same cow. Flow velocities of up to 20 m/sec. can arise in the context of the reverse spray which is favoured by the turbulence of the milk in the collection space. Milk turbulence occurs to a large degree, in particular when air penetrates the milking equipment as occurs at the end of milking when the teat cups slide on the teats, and this leads to the abovementioned high flow velocities, with the bacteria being shot directly into the individual teats, and to a very high risk of infection.

It is known, in order to avoid or reduce the consequences of reverse spray effects, to subdivide collection chambers so that milk is separately removed either from two quarters of the udder in each case or from each quarter of the udder, i.e. so that either two or four separate milk extraction lines lead away from the collection chamber. The division of the collection chamber into four and the use of four separate milk extraction lines is not only complicated but also leads to a very heavy overall arrangement which in turn means that the adhesion of the milking equipment on the teats is no longer guaranteed. If the collection chamber is subdivided into two the weight is indeed somewhat lower but, in this case, reverse spray effects still occur between the two quarters which are connected together via the collection chamber.

The problem underlying the invention is thus to develop a milking apparatus in such a way that it can be realised with a minimum of complication, does not cause any form of cleaning problems, avoids the risk of infection due to reverse flow and back spray and ensures an ideal discharge of milk while simultaneously caring for the teats.

This problem is solved in essence in that valve members are provided in the collection chamber in the region of the openings of the milk line connections, with the valve members being controlled in dependence on the local pressure difference between the collection space and the respective milk line connection and opening only in the direction of the collection space, and in that the valve unit is in each case disposed beneath the teat reception zone within the teat rubber and is changed over between the closed and opened conditions by the wall of the teat rubber which moves in dependence on the pressure difference. The direct utilisation of the teat rubber to actuate the valve results in an extremely simple overall construction which operates in a highly reliable manner. As a result of the introduction of a defined amount of air during each massage pulse, the milk discharges without back flow via the short milk lines and moreover the vacuum is reduced to a large degree during massaging of the teats so that the tissue of the teats is subjected to vacuum to a lesser extent. The dangerous back spray effects are precluded, although the milk coming from the various quarters of the udder is fed into the common collecting space of the collecting chamber, by ensuring that a quarter of the udder which is in the massage phase is clearly shielded against a flow originating from the collection chamber. In this way it is only possible for flow to take place from the individual quarters in the direction of the milk extraction line but not however between the individual quarters. The cooperation of the specially formed collecting chamber with the special milking cups ensures that undesired collapses of the vacuum, which can occur in known milking apparatus via the collection chamber when a teat rubber inner chamber is ventilated during the massage phase and another teat rubber inner chamber of the milking equipment is in the suction phase, are avoided.

The valve unit, the construction of which is particularly simple, is automatically cleaned in a completely trouble-free manner if, in accordance with a special feature of the invention, flushing caps having a small opening in the base of the cap are placed over the heads of the teat rubbers of the milking cups during the flushing process which is customary with milking apparatus of this kind. The valve passage will always be cleaned in a reliable and trouble-free manner as a result of the flow which necessarily takes place through the valve passage.

Further advantageous embodiments and developments of the invention are set forth in the subclaims.

Figure 10:
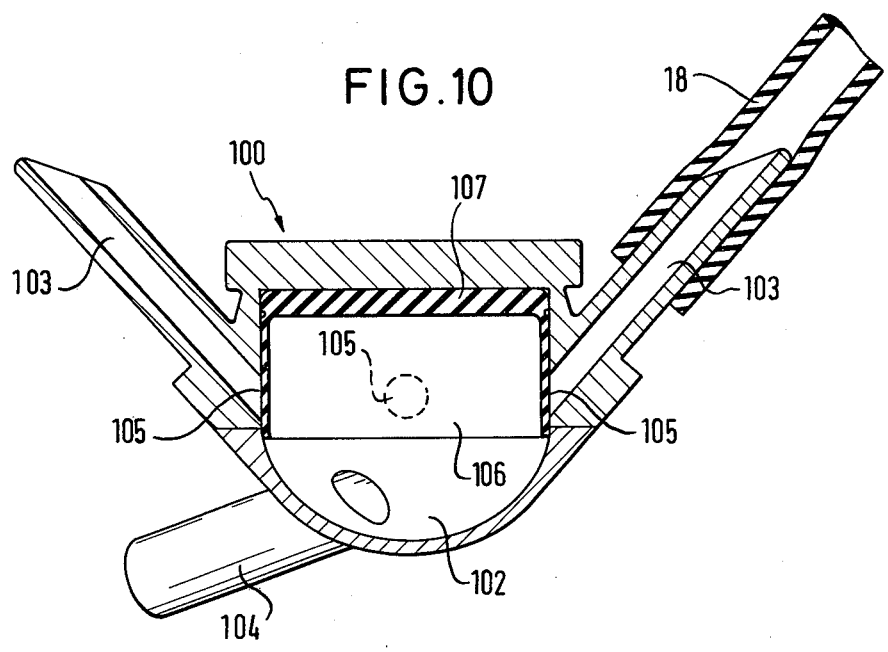
Figure 11:
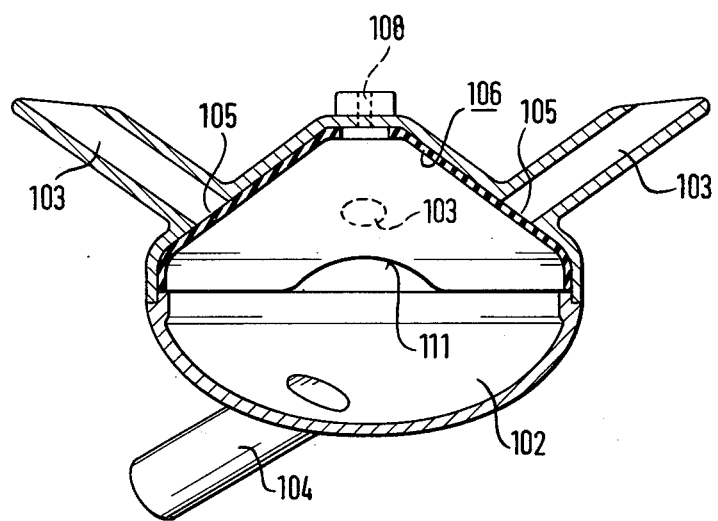
Figure 12:
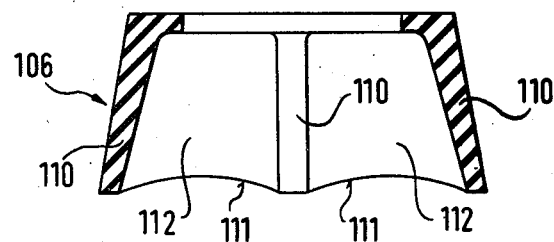
Figure 13:
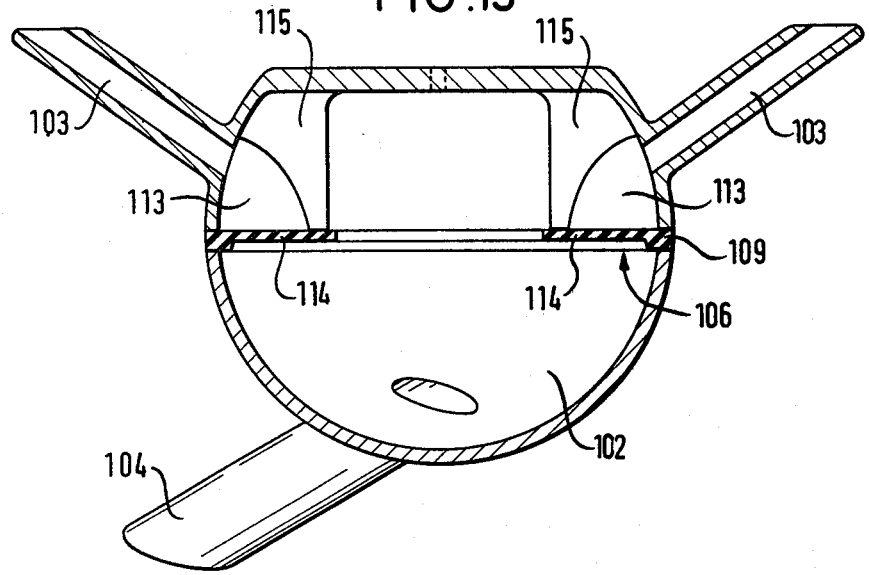
Figure 14:
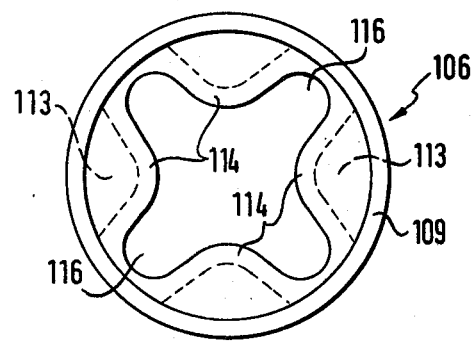
Figure 15:
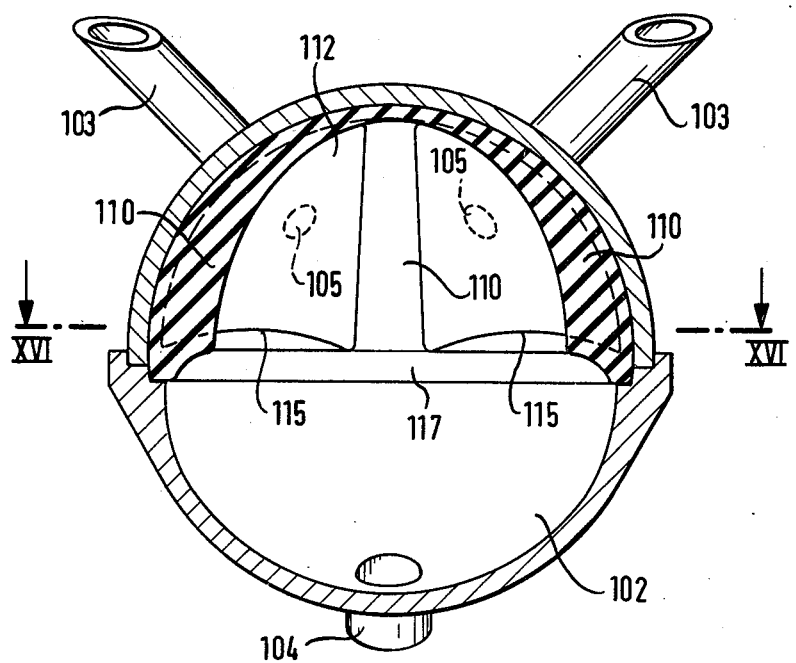
Figure 16:
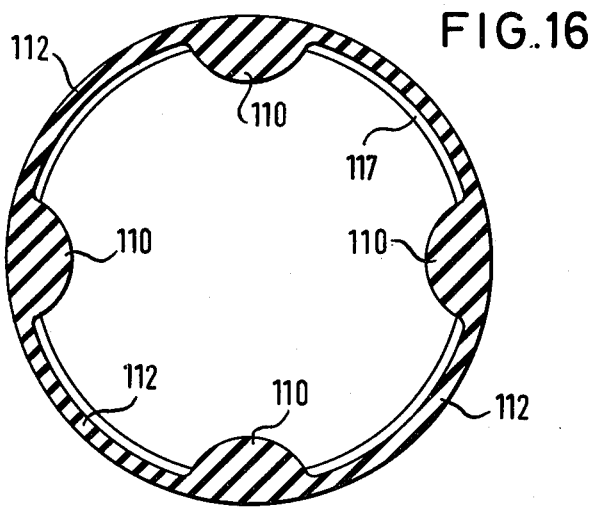

The invention will now be described in more detail in the following with reference to embodiments and referring to the drawings which show:

FIG. 1 a schematic illustration in longitudinal section of a two-chamber milking cup with a first variant of an insert constructed in accordance with the invention, FIG. 1a a second variant of the insert for a two-chamber milking cup in accordance with FIG. 1, FIG. 2 a cross-section of the milking cup of FIG. 1 at the level of the opening of the passage which leads to the atmosphere during the suction phase, FIG. 3 a sectional illustration corresponding to FIG. 2 during the massage phase, FIG. 4 a schematic sectional illustration of an alternative embodiment of a valve unit in accordance with the invention during the suction phase, FIG. 5 the arrangement of FIG. 4 during the relaxation (massage) phase, FIG. 6 a further variant of an insert in accordance with the invention, FIG. 7 a schematic sectional illustration of a two-chamber milking cup with an insert in accordance with FIG. 6 in the massage phase, FIG. 8 a cross-sectional view of the teat rubber used in the milking cup of FIG. 7, FIG. 9 a partial illustration of the milking cup of FIG. 1 with a cleaning cap placed thereon, FIG. 10 a schematic, partially sectioned view of a collection chamber in accordance with the invention, FIG. 11 a corresponding illustration of a further embodiment of a collection chamber, FIG. 12 a schematic illustration of a valve insert for a collection chamber corresponding to FIG. 10, FIG. 13 a schematic illustration of a further variant of a collection chamber in accordance with the invention, FIG. 14 a schematic plan view on a sealing and valve member for use in a collection chamber of the type of FIG. 13;

FIG. 15 a schematic sectional illustration of a further variant of collection chamber and insert, and FIG. 16 a sectional illustration along the line A—A of FIG. 15.

FIG. 1 shows a two-chamber milking cup consisting of a milking cup shell 1 with a connection stub 2 and a teat rubber 3 tensioned within the milking cup shell to accommodate a teat 4 illustrated by a broken line. The milking cup intermediate chamber 5 which is periodically connected to vacuum and to the atmosphere via the connection stub 2 is located between the teat rubber 3 and the milking cup shell 1.

A sight glass 6, which is conventional per se and by means of which the lower end of the teat rubber 3 is clamped in the milking cup sleeve 1, is provided, in accordance with the invention, with a part 7 in the form of a spreader fork which extends into the teat rubber inner chamber. The short milk line 18 which leads to the collection chamber is pushed onto the sight glass stub.

In one of the two fork elements there is provided a passage 8 which leads at one end through the wall of the sight glass to atmosphere and opens at the other end, after turning in a direction at right angles to the longitudinal axis of the milking cup, directly opposite the inner wall of the teat rubber 3. A protective shield 19 is provided in the region of the atomospheric opening of the passage 8. The entry opening to the passage begins behind the shield at the apex of a triangular region so that the intake of coarse particles through the shield and the deposition of dirt at the entry opening is prevented.

The insert 7 gently spreads the teat rubber in the direction of an axial plane extending through the opening 9 of the passage 8 and this gentle spreading simultaneously determines the direction of folding of the teat rubber during collapse (or folding together) of the teat rubber in the massage pulse. The region 10 of the teat rubber 3 which lies directly opposite the opening 9 of the passage forms, together with the opening 9, a valve which is always closed when the teat rubber takes on its rest position, i.e. when no pressure difference is present between the teat rubber inner chamber 12 and the milking cup intermediate chamber 5, and indeed as a result of the light bias brought about by the spreading.

The free end of the insert 7 is provided with a bead 11 and the radially directed end of the passage 8 or the end section of the opening 9 extends through this bead 11.

This shape ensures particularly good contact or formability of the teat rubber at the opening 9 so that one can operate in practice with a very small degree of spreading which effectively only needs to ensure that the teat rubber collapses in a defined manner, i.e. in a defined plane.

The variant of the insert 7 shown in FIG. 1a is distinguished from that of the embodiment of FIG. 1 in that a threaded pin or a spiral coil 20 is provided in the atmospheric end region of the passage 8 with these elements being placed so that they can easily be removed for cleaning. They can also be used to specify the restrictor opening of the passage 8.

The sectional view of FIG. 2 shows the light spreading of the teat rubber 3 by the insert 7. It can be seen in particular that in this condition, i.e. during the suction phase when the teat rubber is not subjected to any pressure differences, the opening 9 of the passage which leads to the atmosphere is clearly closed so that no connection is possible between the atmosphere and the teat rubber inner chamber. The entry of air is thus also not possible.

FIG. 3 shows the teat rubber 3 in the collapsed condition, i.e. during the massage phase, when atmospheric pressure is introduced into the milking cup intermediate chamber 5. As the fold direction of the teat rubber is predetermined by the light spreading which can be seen in FIG. 2 the opening 9 of the passage which leads to the atmosphere is freed on folding or collapsing of the teat rubber because free spaces 14, through which a connection of the passage which leads to the atmosphere with the teat rubber inner chamber takes place, are necessarily formed between the insert 7 and the teat rubber 3 in the end regions of the shallow oval which forms.

FIG. 4 shows an embodiment of the invention in which the teat rubber 3 is also somewhat spread in the valve region in order to provide a clear folding plane; a complete valve unit is however provided in the insert 7 and is actuated in accordance with the invention directly by the teat rubber 3 via connection 3a. The movable element of the valve is designated 13 in FIG. 4 and it can be seen that the opening 9 is closed in the suction phase, when no connection is allowed to take place between the teat rubber inner chamber and the atmosphere, whereas, in the massage phase with the collapsed teat rubber 3—as can be seen in FIG. 5—the wall of the teat rubber actuates the movable element 13 and brings the openings into alignment so that air can be introduced into the teat rubber inner chamber via the opening 9.

The effective open cross-section of the passage 8 is selected so that the quantity of air entering during the massage phase makes a discharge of the individual partial milk columns possible, and thus the discharge of the milk, without reverse washing effects. On the other hand the milk discharge speed is selected so that it is not sufficiently large that undesired foam formation occurs. The smallest cross-sectional opening of the passage 8 is preferably provided in the region of the atmospheric opening which makes it easier to keep this opening free from deposits and contamination.

FIG. 6 shows a spreader frame-like insert 7 which is of conical shape at right angles to the plane of spreading —as can be seen in FIG. 7—so that all in all an insert is present which is formed with a hollow body having large area openings or windows 15 in oppositely disposed regions which are closed in the massage phase by large area contact with the teat rubber 13. As in the previously described inserts, a passage 8 also extends in this insert through the sight glass to atmosphere and opens radially via an opening 9 which is disposed in the vicinity of a bead 10 at the end of the insert.

A notch 17, for example in the upper marginal region of the opening 15 makes it possible to draw off a certain quantity of by-pass air through the opening 15 even when this is closed by the teat rubber contacting the insert.

FIG. 7, which shows the insert of FIG. 6 in the condition it adopts when inserted in a milking cup 1 and which is rotated relative to FIG. 6 through 90°, shows that air can be introduced into the teat rubber inner chamber 12 via the opening 9 when the teat rubber 3 is collapsed, i.e. in the massage phase.

The teat rubber inner chamber 12 is however, in distinction to the embodiments of FIGS. 1 to 4, separated from vacuum during the massage phase because the teat rubber 3 contacts the openings or windows 15 and closes them. The contact force for the teat rubber in the vicinity of the windows 15 can be predetermined by suitable choice of the size of these windows or openings. It is of important significance that one can directly exploit these contact forces in order to ensure an effective massage of the teat 4 in the massage phase. For this purpose, in accordance with the sectional illustration of FIG. 8, the teat rubber 3 is preferably reinforced in the peripheral regions which are aligned with the large area openings 15 or provided with added reinforcements 16 and the like. In this way direct mechanical force transmission can take place from the region of the insert 7 to the teat reception region so that it is possible to ensure both an effective mechanical teat massage and a reduction of the vacuum in the teat rubber inner space 12 to atmospheric pressure, or to approximately atmospheric pressure, by the introduction of air.

The introduction of air and the closure of the teat rubber inner space from vacuum necessarily cooperate in an advantageous manner because the time at which air is introduced is always prior to closing of the windows 15. This favours the withdrawal of milk while still allowing optimum conditions to be obtained for teat massage in the massage phase. The illustration of FIG. 9 shows how, for the purpose of ensuring an exceptionally effective cleaning of the milking cups and in particular of the air inlet passage 8, synthetic caps 21 consisting of resilient material and provided with a relatively small opening 22 at their bases can be placed on the respective teat rubber heads. If the milking cups with rolled on cleaning caps of this kind are placed in a water container, or in a container of cleaning agent, and the milking equipment is set in operation, very pronounced flows take place in the milking cups which also ensure cleaning of the passages 8 and guarantee that these passages 8 are always kept open.

FIG. 10 shows a collecting chamber of customary construction which is designated with the general reference numeral 100 and which includes a collection space 102, connection stubs 103 (which are each associated with a respective quarter of the udder) for short milk lines which lead to the milking cups and a connection stub 104 opening into the base of the milking chamber for a milk discharge line which is connected to a vacuum source. The openings 105 of the connection stubs 103 lie in the vicinity of the side wall of the collection space 102 and are mutually and regularly displaced relative to one another.

In the collection space 102 there is arranged an annular insert 106 of elastic material which lies against the side wall and covers the openings 105 of the connection stubs 103. The fixation and positioning of this insert can be achieved, by way of example, by a reinforced annular bead 107 provided at the roof and/or base ends. It is however important that the wall regions of the resilient insert disposed in front of the openings 105 always have sufficient elasticity to be able to satisfy their associated valve function without problem.

The collection chamber shown in FIG. 11, in which a suitably bored air inlet 108 is also indicated, also uses the same principle as the embodiment of FIG. 10. The insert 106 of resilient material requires however a conical form so that it is matched to the shape of the collection chamber in order to ensure the required contact in the region of the side wall of the collection space 102.

The insert 106 is in both cases insertable into the collection chamber and removable again for cleaning purposes without problem because it is sufficient to suitably support this insert 106 in the collection space in order to obtain the necessary fixation. For this purpose the insert 106 can, as shown in FIG. 12, be provided with stiffening and tensioning ribs 110 in the areas between the sections 112 which satisfy the valve function. After insertion of the insert into a collecting chamber the stiffening and tensioning ribs ensure contact with bias of the insert against the side wall of the collection chamber and, in this manner, also ensure that any cross flows between adjacent openings 105 are reliably prevented.

As indicated in FIG. 11, and also in FIG. 12, the regions 112 of the insert which satisfy the valve function can be of shorter construction at their lower edges, or provided with cut-outs 111, which favours the flow of milk from the short milk lines into the collection space 102, without however disadvantageously affecting the closure effect of these wall regions having regard to the tendency towards the formation of flows from the collection space 102 to one quarter of the udder.

The embodiment of FIG. 13 is distinguished from previously described collection chamber variants above all in that the insert 106, which satisfies the valve function relative to the four connection stubs 103, is combined into an integral unit with the ring seal 109 provided between the two parts of the collection chamber. This is possible because an inlet chamber 113 within the collection space 102 is associated with each connection stub 103, with the opening of the inlet chamber 113, which leads into the collection space 102 lying substantially in the plane of separation of the collection chamber, so that the radially inwardly extending parts 114 of the sealing ring 119 can form sealing flaps which allow flows coming from the connection stubs 103 to enter unhindered into the collection space 102 but however prevent any flow from the collection space 102 in the direction of a connection stub 103.

The construction of the inlet chambers 113 can be achieved by an appropriately shaped insert 115, for example of synthetic material, it is however also possible to correspondingly shape the upper part of the collection chamber at the time of manufacture.

FIG. 14 shows a plan view of the ring seal 109 with the integral sealing flaps 114. The openings of the inlet chambers 113 are illustrated in broken lines. A radially inwardly extending annular surface which satisfies the function of the sealing flaps 114 in the same manner can also be formed on the seal ring 109 in place of the sealing flaps 114. The elasticity or mobility of the sealing areas can however be particularly favourably preselected by the provision of appropriate cut-outs 116. Cross flow between adjacent openings 113 of the inlet chambers is not possible in this embodiment so that the advantages of simplicity and functional reliability are particularly favourably combined by this solution.

FIG. 15 once again shows a collection chamber which, in the customary manner, is of two-part construction and incorporates an insert in accordance with the invention. Clearly to be seen in this sectional illustration are the tensioning and retaining ribs 110 which divide the individual quadrants from one another and which merge at their lower ends into a shield ring 117 which, together with the ribs 110, forms a stable cage which can then be biased upwardly as a unit and indeed preferably in conjunction with the mutual clamping of the two halves of the collection chamber. For this purpose a support surface can, if necessary, be provided in the lower part of the collection chamber. The vertical ribs 110 extend from the point at which they meet the shield ring 117 at least as far as the inner diameter of this shield ring and preferably project radially inwardly beyond this shield ring so that a lateral overflow of milk in the collection chamber from one quadrant into another quadrant is prevented.

The shield ring 117 also has the important task of preventing flow beneath the seal regions 112. The valve regions 112, which in the rest condition close the openings leading to the connection stubs 103 and which are preferably lightly biased into the closed position each have outlet slots 115 substantially directly adjacent the shield ring 117. Each slot has a straight line shape; however, a gently arched shape, as indicated in the drawing, is also possible. Sealing lips can likewise be additionally provided at the outer sides along the vertical stiffening ribs 110 in order to ensure an even more reliable separation of one milk inlet from the next.

The sectional view of FIG. 16 shows the separating and tensioning ribs 110 and also the shield ring 117 which extends radially inwardly beyond the sealing regions 112. It can be readily seen that a milk flow coming from the lower collection area cannot wash behind the regions 112, because of the presence of this shield ring 117, but will instead impinge on these sealing regions and indeed contribute to the desired seal.

All the embodiments described have the common feature that the disturbing and dangerous reverse washing and back spray effects are prevented by surprisingly simple means, and indeed without the need for a fundamental change in the conception of known milking systems and known collection chambers. A further, quite decisive advantage of the solution of the invention lies in the fact that handling and cleaning have not been made more difficult and thus no penalties with regard to hygiene need be tolerated despite the functional improvements that are achieved.

We claim:

1. Milking apparatus comprising a collection chamber; a connection for connecting said collection chamber to a vacuum source; four two-chamber milking cups each including a respective teat rubber, each said teat rubber having a wall, and defining, within the associated milking cup, an inner chamber including a teat reception zone and an intermediate chamber; means for subjecting said intermediate chambers to periodically varying pressures to generate suction and massage phases; respective short milk lines for connecting said milking cups to mutually displaced collection chamber connections leading to respective openings into said collection chamber; each said milking cup furthr including a valve unit actuated in dependence on the pressure differences which occur in the suction and massage phases to connect the inner chamber of the milking cup and the associated milk line to atmosphere during the massasge phase; valve members provided in the collection chamber in the region of said openings, with the valve members being controlled in dependence on the local pressure difference between the collection space and the respective milk line connection and opening only in the direction of the collection space; wherein each said valve unit is disposed within the associated teat rubber beneath the teat reception zone and is changed over between the closed and opened conditions by the wall of the teat rubber which moves in dependence on the pressure difference; wherein each said valve unit comprises movable and stationary parts, said movable part being formed by a part of the wall of the teat rubber and said stationary part being formed by an insert, which extends from the lower end of the respective milking cup into the teat rubber inner chamber, each said insert having a passage which opens at one end to the atmosphere and at the other end faces the inner wall of the associated teat rubber, and wherein said insert lightly spreads the teat rubber in the direction of an axial plane which extends at least substantially through the opening of the passage, whereby said wall part of said teat rubber closes said passage opening during said suction phase but frees said opening for the flow of air therethrough as said teat rubber collapses during said massage phase.

2. Apparatus in accordance with claim 1 wherein each insert has a free end which projects into the associated teat rubber there being a radially outwardly projecting bead formed at said free end and wherein the passage opening which cooperates with the wall part of the teat rubber is formed in the bead.

3. Apparatus in accordance with claim 1 wherein the opening at the atmosphere end of the passage is arranged behind a protective shield, has a smaller cross-section than the passage which leads to the inner chamber of the milking cup and forms the restrictor for the passage.

4. Apparatus in accordance with claim 1 wherein a removable filter is provided in the atmosphere end of the passage.

5. Apparatus in accordance with claim 1 wherein said insert is constructed in the shape of a spreader fork having two diametrically oppositely disposed spreader elements, with said passage being provided in one of the two spreader elements.

6. A teat rubber in accordance with claim 1 wherein said insert is constructed in the form of a spreader frame having two limbs, with said passage being provided in one of the two limbs of the frame; wherein the spreader frame-like insert is constructed to diverge in a downward direction at right angles to said axial plane; and wherein said insert which is formed as a hollow body is provided with large area openings in oppositely disposed regions, with these openings being closed in the massage phase by contact with the teat rubber.

7. Apparatus in accordance with claim 6 and wherein a notch is provided in the edge of at least one of the large area openings which ensures a defined air inlet during contact by the teat rubber.

8. Apparatus in accordance with the claim 1 wherein said collecting chamber comprises upper and lower parts and wherein said valve members are provided on an insert inserted into said collecting chamber, said valve members being formed as movably arranged elements of resilient material which each cover the associated opening.

9. Apparatus in accordance with (one of the preceding claims and characterised in that) claim 8 wherein a peripherally extending bead-like shield ring is provided at the base end of the insert, and wherein respective at least substantially slit-shaped outlets are provided in the material of the insert between this shield ring and the respective openings in the wall of the collection space.

10. Apparatus in accordance with claim 8 wherein said elements of resilient material which cover the openings are formed by regions of said insert which fits against the inner wall of the collection space.

11. Apparatus in accordance with claim 10 and wherein reinforcements forming tensioning and/or retaining members are provided in the regions of said insert between the openings.

12. Apparatus in accordance with claim 8 wherein a seal is provided betwen said upper and lower parts of the two-part collection chamber and wherein said seal is an integral part of the insert which forms the valve members.

13. Apparatus in accordance with claim 12 wherein a separate inlet chamber in the collection space is associated with each of said collection chamber connections, wherein each said inlet chamber has an outlet opening which leads into the collection chamber and which lies in a transverse plane parallel to the plane of separation of the collection chamber, and wherein said outlet openings are closed by means of elements of said seal which project into said collection chamber.

14. Milking apparatus comprising a collection chamber; a connection for connecting said collection chamber to a vacuum source; four two-chamber milking cups each including a respective teat rubber, each said teat rubber having a wall, and defining, within the associated milking cup, an inner chamber including a teat reception zone and an intermediate chamber means for subjecting said intermediate chambers to periodically varying pressures to generate suction and massage phases; respective short milk lines for connecting said milking cups to mutually displaced collection chamber connections leading to respective openings into said collection chamber; each said milking cup further including a valve unit actuated in dependence on the pressure differences which occur in the suction and massage pulses to connect the inner chamber of the milking cup and the associated milk line to atmosphere during the massasge phase; wherein each said valve unit is disposed within the associated teat rubber beneath the teat reception zone and is changed over between the closed and opened conditions by the wall of the teat rubber which moves in dependence on the pressure difference; wherein each said valve unit comprises movable and stationary parts, said movable part element being formed by a part of the wall of the teat rubber and said stationary part being formed by an insert, which extends from the lower end of the respective milking cup into the teat rubber inner chamber, each said insert having a passage which opens at one end to the atmosphere and at the other end faces the inner wall of the associated teat rubber, wherein said insert lightly spreads the teat rubber in the direction of an axial plane which extends at least substantially through the opening of the passage, whereby said wall part of said teat rubber closes said passage opening during said suction phase but frees said opening for the flow of air therethrough as said teat rubber collapses during said massage phase and wherein a removable filter is provided in the atmosphere end of the passage.

* * * * *